(12) United States Patent
Hartelius

(10) Patent No.: US 10,004,209 B2
(45) Date of Patent: Jun. 26, 2018

(54) UNIVERSAL LAUNCHER

(71) Applicant: Worldwise, Inc., Novato, CA (US)

(72) Inventor: Mark Hartelius, Chicago, IL (US)

(73) Assignee: Worldwise, Inc., Novato, CA (US)

( * ) Notice: Subject to any disclaimer, the term of this patent is extended or adjusted under 35 U.S.C. 154(b) by 357 days.

(21) Appl. No.: 14/921,779

(22) Filed: Oct. 23, 2015

(65) Prior Publication Data

US 2017/0112099 A1    Apr. 27, 2017

(51) Int. Cl.
*F41B 3/04* (2006.01)
*A01K 15/02* (2006.01)
*A63B 65/12* (2006.01)

(52) U.S. Cl.
CPC .............. *A01K 15/025* (2013.01); *F41B 3/04* (2013.01); *A63B 65/12* (2013.01); *A63B 2207/00* (2013.01); *A63B 2207/02* (2013.01)

(58) Field of Classification Search
CPC ................................ F41B 3/04; A01K 15/025
USPC ..................................... 124/5; 119/702, 707
See application file for complete search history.

(56) References Cited

U.S. PATENT DOCUMENTS

| | | | | |
|---|---|---|---|---|
| 3,537,438 A * | 11/1970 | Reed | ........................... | F41J 9/28 124/43 |
| 3,901,208 A * | 8/1975 | Laporte | ...................... | F41J 9/28 124/43 |
| 4,076,004 A * | 2/1978 | Huelskamp | ................. | F41J 9/28 124/43 |
| 4,984,556 A * | 1/1991 | Glass | ........................ | F41B 3/00 124/42 |
| 6,076,829 A * | 6/2000 | Oblack | ................... | A63B 59/20 124/5 |
| 6,508,732 B1 * | 1/2003 | Romberger | ............ | A63B 39/06 273/DIG. 24 |
| 7,128,556 B2 * | 10/2006 | Wessells | .................... | F41B 3/04 425/276 |
| 7,476,142 B2 * | 1/2009 | Mastrosimone-Gese | | A63H 33/006 446/227 |
| 7,665,453 B1 * | 2/2010 | D'Agostino | ......... | A63B 65/122 124/5 |
| 7,665,454 B1 * | 2/2010 | D'Agostino | .............. | F41B 3/04 124/5 |
| 7,686,001 B2 * | 3/2010 | Fitt | ........................ | A63B 59/20 124/5 |
| 7,815,429 B1 * | 10/2010 | Clark, Jr. | .................. | F41B 3/04 124/5 |
| 7,895,995 B2 * | 3/2011 | Simon | .................... | A63H 33/18 119/702 |

(Continued)

*Primary Examiner* — Alexander Niconovich
(74) *Attorney, Agent, or Firm* — Bay Area Technology Law Group PC

(57) ABSTRACT

A device for launching an object which includes a flexible shaft having a distal end and a proximal end and a handle located at the proximal end sized to enable a user to grip the device while launching an object. An object gripping claw is located at the distal end of the flexible shaft, the gripping claw including first and second flanges which together define a capture volume for an object, the first flange being a stationary post and the second flange being a flexible web extending from the flexible shaft, the second flange being sufficiently flexible to deform in retaining an object within the capture volume and to release an object for launching when the flexible shaft is swung in a forward circular path.

1 Claim, 4 Drawing Sheets

(56) References Cited

U.S. PATENT DOCUMENTS

| | | | | |
|---|---|---|---|---|
| 7,900,617 B1* | 3/2011 | Kersh | F41J 9/30 | 124/5 |
| 8,015,968 B2* | 9/2011 | Christ | A63B 65/00 | 124/5 |
| 8,028,684 B1* | 10/2011 | Weissmann | F41B 3/03 | 124/5 |
| 8,302,585 B2* | 11/2012 | FitzGerald | A63B 59/20 | 124/5 |
| 8,387,601 B1* | 3/2013 | Christensen | F41J 9/18 | 124/5 |
| 8,511,292 B2* | 8/2013 | Black | F41J 9/28 | 124/5 |
| 9,010,279 B1* | 4/2015 | Saber | A01K 27/008 | 119/702 |
| 2012/0048251 A1* | 3/2012 | Oblack | A01K 15/025 | 124/5 |
| 2014/0065925 A1* | 3/2014 | Oren | A63H 33/22 | 446/227 |
| 2015/0342146 A1* | 12/2015 | Tucker | A01K 15/025 | 124/79 |

* cited by examiner

UNIVERSAL LAUNCHER

TECHNICAL FIELD

The present invention is directed to a device for throwing an object particularly in playing a game of fetch with an animal.

BACKGROUND OF THE INVENTION

As any dog owner is well aware, a favorite pastime enjoyed by virtually all canine pets is to retrieve objects thrown by the pet owner. In most instances, the pet owner will tire long before his or her dog as most people are not conditioned to repeatedly throw objects long distances. Some pet owners resort to the use of tennis rackets and bats and, in either case, the pet owner must still deal with picking up the object to re-throw it which can oftentimes be covered with dog saliva.

There have been attempts in the past to create products which have been specifically designed for improving the ball fetching experience. One such product is described in the U.S. Pat. No. 6,076,829. As described in the '829 patent, the ball throwing apparatus includes an elongated shaft with a flexible upper neck portion extending from a handle portion and, intricately formed over the distal end of the neck portion, is a rigid half-spherical structure which acts as a ball engaging means designed to snap-fit around a standard tennis ball. Although this product improves the ball-fetching experience, it is fraught with limitations which the present invention is intended to overcome.

Fundamental among those limitations is that the product described and claimed in the '829 patent has a spherical structure sized to rigidly retain a tennis ball. As such, not only is this product limited to the use of a standard tennis ball but if a tennis ball is new and thus possesses a thick, dense covering, the ball can lodge within the half-spherical structure and not optimally release as intended by the user. Conversely, if a ball is well-worn, its outer dimension could very well be reduced resulting in the ball releasing prematurely while not maintaining contact with the half-spherical structure as intended. The outer ball dimension can also be influenced by the extent that the ball is pressurized and noting that the apparatus is intended to be used with a canine pet, tennis balls can oftentimes be punctured during vigorous activity which would affect the tennis ball-spherical structure interface yet further.

It is thus an object of the present invention to provide a universal launcher which overcomes the limitations described above.

It is yet another object to the present invention to provide a universal launcher which is not limited to accepting and selectively launching standard tennis balls but which can be used to launch objects of various configurations including those which are not necessarily spherical.

These and further objects will be readily apparent when considering the following disclosure and appended claims.

SUMMARY OF THE INVENTION

A device for launching an object, said device comprising a flexible shaft having a distal end and a proximal end, a handle located at said proximal end of said flexible shaft sized to enable a user to grip said device while launching an object and an object gripping claw located at said distal end of said flexible shaft, said gripping claw comprising first and second flanges which together define a capture volume for an object, said first flange comprising a stationary post and said second flange comprising a flexible web extending from said flexible shaft, said second flange being sufficiently flexible to deform in retaining an object within said capture volume and to release an object for launching when said flexible shaft is swung in a forward circular path.

DETAILED DESCRIPTION OF THE INVENTION

Figure 1:
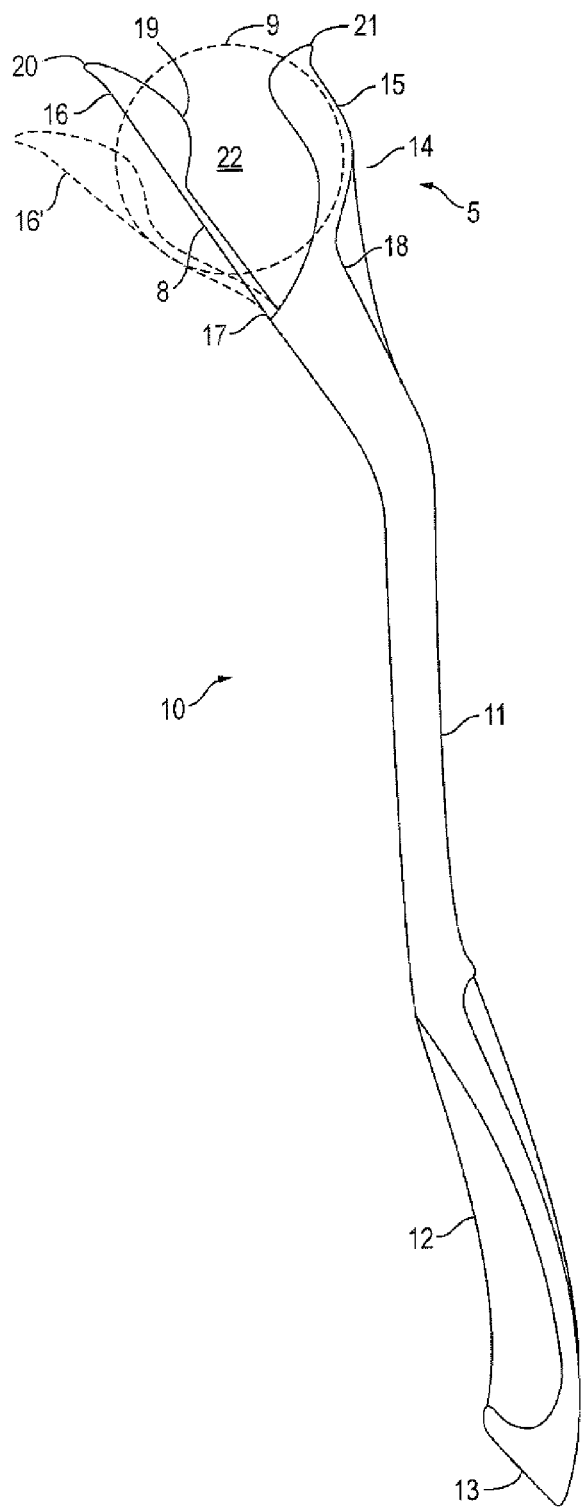
FIG. 1 is a side view of the universal launcher of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In tuning first to FIG. 1, as noted, the present invention is directed to device 10 constituting a first embodiment of the present universal launcher. Device 10 includes flexible shaft 11 having distal end 14 and proximal end 13. Handle 12 is located at proximal end 13 of flexible shaft 11 which is sized to enable user to grip device 10 while launching an object.

At distal end 14 of flexible shaft 11 is located object gripping claw 5 comprising first and second flanges 15 and 16, which together define capture volume 22. In the illustration of FIG. 1, the object is shown as spherical ball 9 although, as noted previously, the present universal launcher can be employed with virtually any object which would fit within capture volume 22 and be releasably retained therein.

In referring once again to FIG. 1 and particularly to gripping claw 5, first flange 15 comprises a relatively stationary post shown as an extension to flexible shaft 11 at distal end 14 generally configured of a rigid or semi-rigid plastic which is not intended to significantly deform when an object is captured and retained within capture volume 22.

Gripping claw 5 also comprises second flange 16 which includes relatively flexible web 8 extending from flexible shaft 11 which, unlike first flange 15, is sufficiently flexible to deform in retaining an object within capture volume 22 and to release the object for launching when flexible shaft 11 is swung in a forward circular path. In referring once again to FIG. 1, when an object, such as ball 9 is releasably retained within capture volume 22, second flange 16 deforms by flexing web 8 assuming the orientation shown in phantom as 16'. Second flange 16 and, particularly web 8 is sufficiently flexible such that web 8 only deforms when objects such as ball 9 are retained within capture volume 22 but returns to its original or undeformed orientation once the object is launched. Thus, the gripping force created between flanges 15 and 16 is repeatable and not compromised by repeated uses of the present invention.

In order to facilitate the pickup of an object residing on the ground and in minimizing the need to touch an object which may be covered by dog saliva, second end 20 of second flange 16 comprises an edge angled away from capture volume 22. Similarly, as a preferred embodiment, second edge 21 of first flange 15 is also angled away from capture volume 22 Thus, in use, the object, residing at ground level, could be captured by gripping claw 5 by positioning the gripping claw directly over the object and pressing down upon it whereupon second flange 16 would deform through deformation of web 8 to its 16' orientation thus frictionally and releasably retaining the object within capture volume 22.

As a further preferred embodiment, second flange 16 is provided with rib 19 which, in the embodiment of FIG. 1, comprises a bulbous body that extends within capture volume 22. Ideally, rib 19 reduces in size as it extends towards second end 20 of second flange 16. This creates an ideal gripping claw, the bulbous nature of rib 19 acting to prevent unintended dislodgment of an object from capture volume 22.

Figure 2:
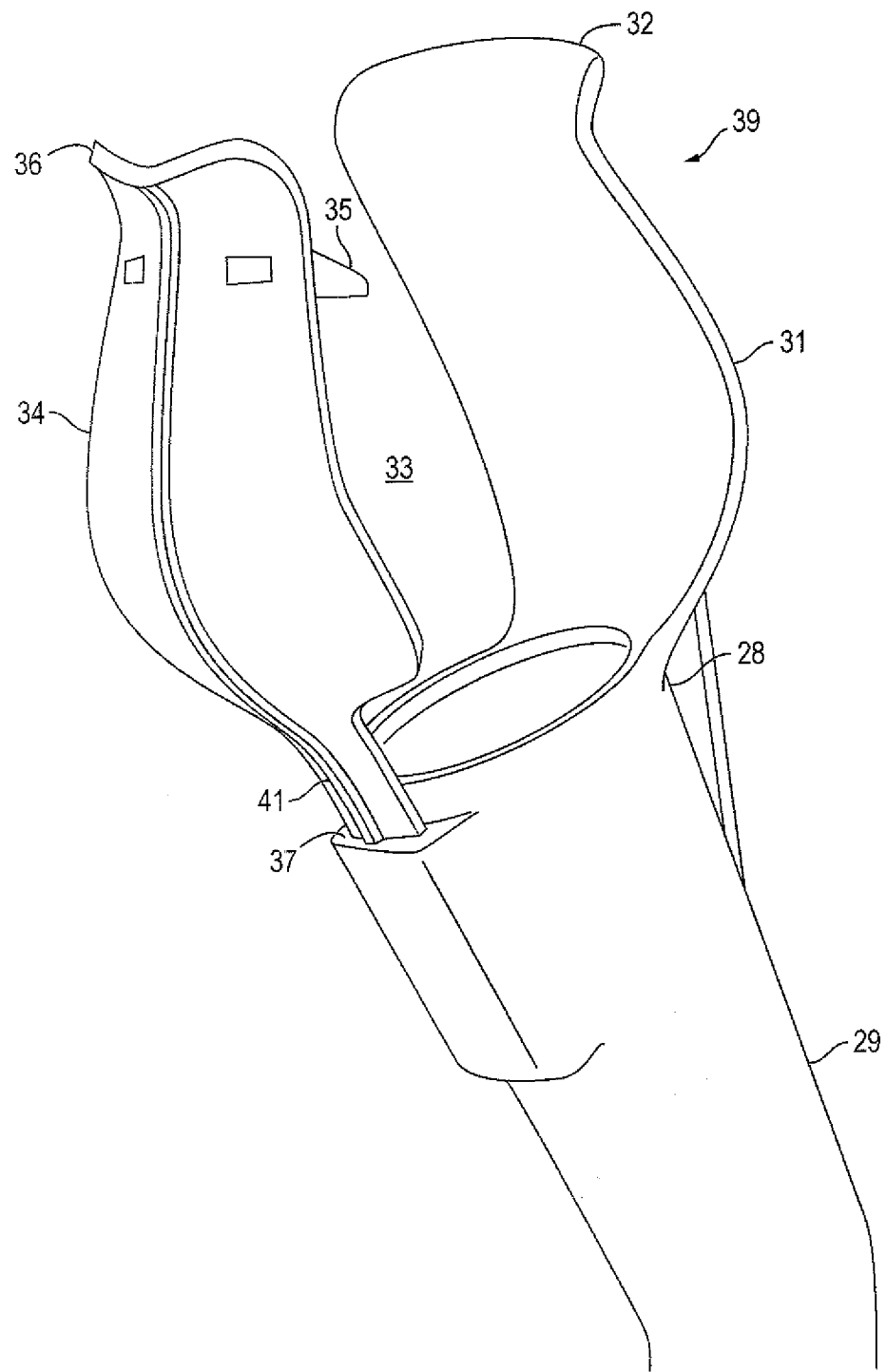
FIG. 2 is a partial view of the universal launcher of the present invention illustrating an alternative capture device.

It should be readily apparent that the nature of the present invention is not necessarily limited to the physical embodiment illustrated in FIG. 1 and, as a non-limiting example of another equally preferred embodiment, reference is made to that of FIG. 2.

In turning to FIG. 2, flexible shaft 29 is shown supporting gripping claw 39 at its distal end 28. As in the embodiment of FIG. 1, first flange 31 is intended to be relatively rigid and usually molded as an extension of flexible shaft 29 is shown. Second flange 34 is connected to flexible shaft 29 at distal end 28 by relatively flexible web 41. To again facilitate the capture of an object residing at ground level, first flange 31 is provided with end 32 which is angled away from capture volume 33 and, similarly, second flange 34 is provided with end 36 which is again angled away from capture volume 33. In this embodiment, rather than to provide a bulbous rib, protrusions 35 extend from second flange 34 which, as was the case with rib 19 of FIG. 1, helps to releasably retain an object within capture volume 33 until a user intends to release it by swinging the universal launcher in a forward direction along a circular path. This motion is fully described in U.S. Pat. No. 6,076,829, the disclosure which is incorporated by reference herein.

Figure 3:
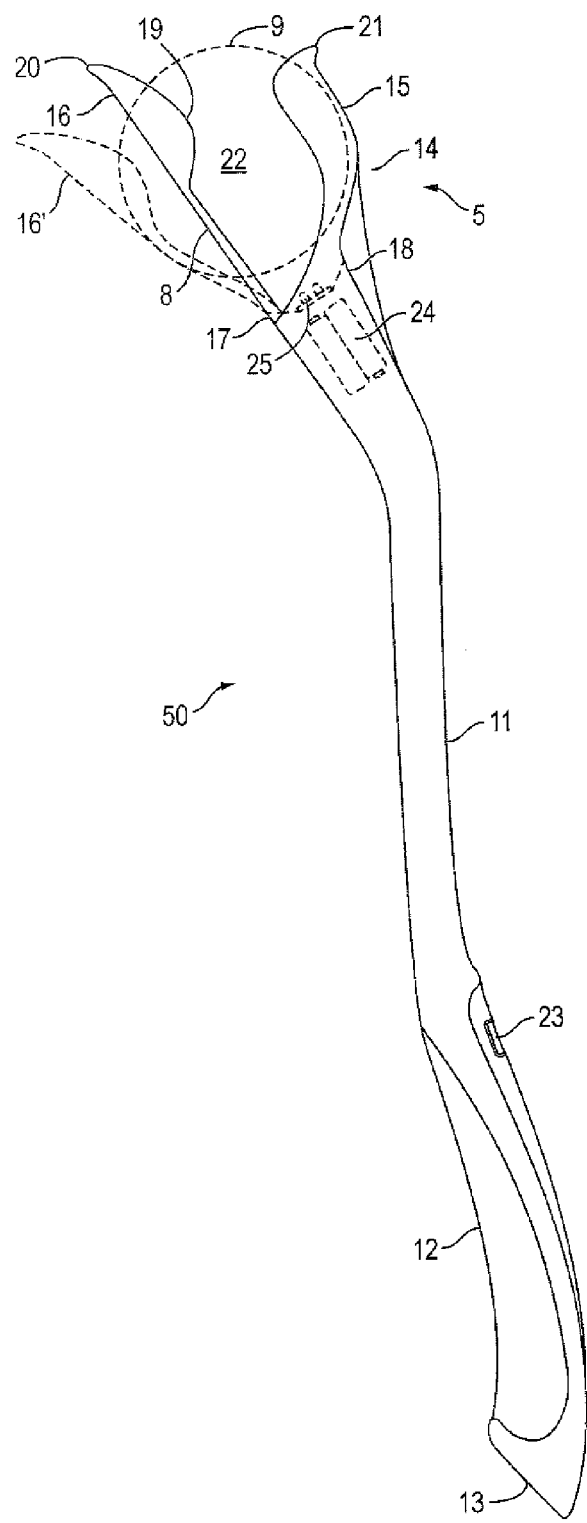
FIG. 3 is a side view of an alternative embodiment of the universal launcher of the present invention.
Figure 4:
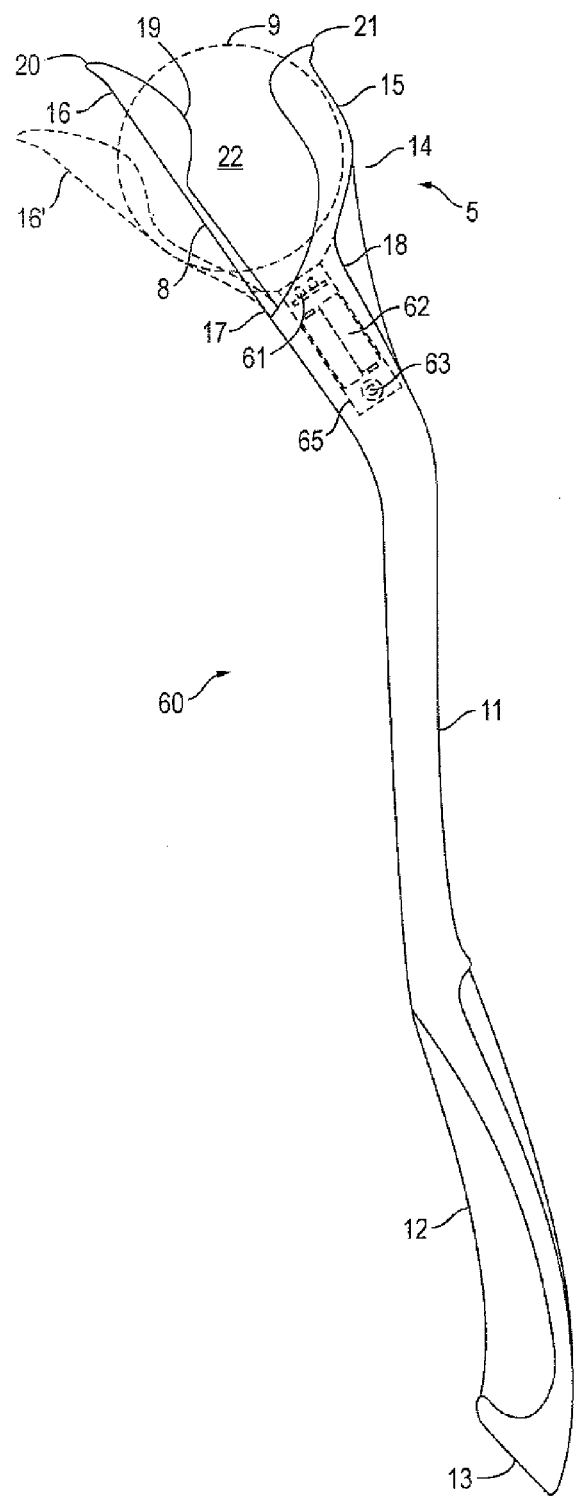
FIG. 4 is a side view of yet a further embodiment of the present invention.

As yet a further embodiment of the present invention, reference is made to FIGS. 3 and 4. In order to add interest and to maintain an animal's involvement in the game of fetch, the thrown object can be composed of a phosphorescent material which can be made to glow when activated by a suitable light source, such as LEDs 25 (FIG. 3) and 61 (FIG. 4). In turning first to FIG. 3, LEDs 25 are powered by batteries 24 which are integrated within handle 13 of universal launcher 50. The LEDs are activated by switch 23 also integrated within handle 13. Alternatively, universal launcher 60 can be fabricated much like universal launcher 10 (FIG. 1) but in this instance constructed to receive module 65 as a later sold add on to the device, module 65 including LED 61, battery 62 and switch 63. In either case, the LEDs are directed toward capture volume 22/23 which can activate an object such as object 9 when the object is composed of a glows in response to activation by a UV light source. Thus, each time the engaged pet brings object 9 back to the pet owner fox relaunching, as it resides within the capture volume, the phosphorescence within the object is re-energized by LEDs 25/61 causing the object to glow as a further attractant and to facilitate retrieval of object 9, particularly when fetching is carried out in low light conditions.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A device for launching an object, said device comprising a flexible shaft having a distal end and a proximal end, a handle located at said proximal end of said flexible shaft sized to enable a user to grip said device while launching said spherical object and an object gripping claw located at said distal end of said flexible shaft, said gripping claw comprising first and second flanges which together define a capture volume for said object, said first flange comprising a stationary post extending from said flexible shaft and said second flange comprising a flexible web extending from said flexible shaft, said second flange being sufficiently flexible to deform in retaining an object within said capture volume and to release an object for launching when said flexible shaft is swung in a forward circular path toward said second flange.

* * * * *